United States Patent

[11] 3,626,107

[72] Inventors Loren K. Armstrong
Fairport;
George R. Bergquist, Rochester, both of N.Y.
[21] Appl. No. 854,244
[22] Filed Aug. 29, 1969
[45] Patented Dec. 7, 1971
[73] Assignee Stromberg-Carlson Corporation
Rochester, N.Y.

[54] THREE-WAY CALLING AND CALL-WAITING ARRANGEMENTS FOR STEP-BY-STEP TELEPHONE SYSTEMS
4 Claims, 9 Drawing Figs.

[52] U.S. Cl. .......... 179/18 BC, 179/18 BG, 179/84 B
[51] Int. Cl. .......... H04m 3/56, H04m 3/58
[50] Field of Search .......... 179/18 BG, 18 BC, 84 B

[56] References Cited
UNITED STATES PATENTS

| | | | |
|---|---|---|---|
| 3,517,139 | 6/1970 | Whitney | 179/18 BG |
| 3,144,517 | 8/1964 | Albrecht | 179/18 BC |
| 3,112,373 | 11/1963 | Weinberg | 179/18 BG |

*Primary Examiner*—Kathleen H. Claffy
*Assistant Examiner*—Thomas W. Brown
*Attorneys*—Hoffman Stone and Charles C. Krawczyk

ABSTRACT: Relay trees providing call-waiting and three-way calling services in step-by-step telephone switching systems, including interlock connections to insure unambiguous operation. The subscriber's line makes two appearances in the linefinder and connector banks of the exchange, and is also connected to an auxiliary line circuit. The call-waiting and three-way calling circuits are individually assigned to the respective lines subscribing for them. Taken together, the circuits provide service substantially equivalent, and in respect of the conference capability, superior to a key-set telephone with two lines to the exchange and bidirectional trunk hunting.

INVENTORS
L. K. ARMSTRONG
G. R. BERGQUIST
BY
Hofman Stone
ATTORNEY

INVENTORS
L. K. ARMSTRONG
G. R. BERGQUIST
BY
Hofman Stein
ATTORNEY

INVENTORS
L. K. ARMSTRONG
G. R. BERGQUIST
BY
Hofman Stone
ATTORNEY

| COIL | CONT. | LOC. | COIL | CONT. | LOC. | COIL | CONT. | LOC. |
|---|---|---|---|---|---|---|---|---|
| CB | | F8 | RE | | G5 | A1 | | D8 |
| | 1 | A4 | SN | | F4 | | 1,2 | F7 |
| | 2,3 | B8 | | 1 | B6 | | 3,4 | G6 |
| CBS | | A5 | | 2 | C8 | | 5,6 | D8 |
| | 1 | F6 | | 3 | F3 | | 7 | E4 |
| | 2,3 | C5 | C | | D6 | TS | | B4 |
| | 4 | E6 | | 1 | D9 | | 1 | B4 |
| RD | | B9 | | 2 | C7 | | 2 | B6 |
| | 1 | B4 | | 3 | D8 | | 3 | C5 |
| | 2 | F5 | | 4 | C7 | TM | | B4 |
| | 3 | D7 | INC | | B6 | | 1 | C8 |
| | 4 | C9 | | 1,2 | B6 | | 2 | G3 |
| | 5 | G6 | | 3 | C4 | B | | D7 |
| | 6 | F6 | RU | | F4 | | 1 | D8 |
| | 7 | D6 | | 1 | G7 | | 2 | G6 |
| | 8 | F5 | | 2 | F7 | | 3 | F7 |
| RD1 | | C10 | | 3 | G8 | | 4 | D5 |
| | 1 | D9 | | 4 | F8 | | 5,6 | G3 |
| | 2 | D3 | SH | | E8 | ET | | C5 |
| | 3,4 | B5 | | 1,2 | G5 | | 1 | C4 |
| | 5 | C9 | | 3 | B5 | | 2 | F4 |
| B1 | | D8 | | 4,5 | E5 | | 3 | E5 |
| | 1,2 | D7 | RE1 | | E5 | ST | | B3 |
| A | | D8 | | | | | 1 | B4 |
| | 1 | G4 | | | | | 2 | B5 |
| | 2 | D8 | | | | | | |
| | 3 | D9 | | | | | | |
| | 4 | G4 | | | | | | |

FIG. 6

INVENTORS
L. K. ARMSTRONG
G. R. BERGQUIST
BY
Hofgren Stone
ATTORNEY

INVENTORS
L. K. ARMSTRONG
G. R. BERGQUIST
BY
H. Hofman Stone
ATTORNEY

INVENTORS
L. K. ARMSTRONG
G. R. BERGQUIST
BY
ATTORNEY

| COIL | CONT. | LOC. | COIL | CONT. | LOC. | COIL | CONT. | LOC. | COIL | CONT. | LOC. | COIL | CONT. | LOC. |
|---|---|---|---|---|---|---|---|---|---|---|---|---|---|---|
| RT | | F8 | HB | | D8 | RS | | C6 | SL | | F7 | INE | | B6 |
| | 1 | D7 | | 1 | C7 | | 1 | E8 | | 1 | E8 | | 1 | G9 |
| | 2 | E8 | | 2 | G5 | | 2 | G4 | | 2 | B8 | | 2 | F9 |
| | 3,4 | G7 | | 3 | F5 | | 3 | F6 | | 3 | E9 | | 3 | G9 |
| | 5 | B6 | | 4 | F4 | | 4 | D8 | | 4 | D8 | | 4 | F9 |
| | 6 | D5 | | 5 | D8 | | 5 | C7 | | 5 | F5 | | 5 | G9 |
| RL | | F8 | | 6 | D7 | | 6 | D6 | | 6 | G4 | TMG | | B4 |
| | 1 | E8 | | 7 | G5 | | 7 | E6 | | 7 | C7 | | 1,2 | B3 |
| RLA | | F7 | | 8 | E5 | | 8 | C7 | | 8 | F5 | | 3 | G9 |
| | 1 | D8 | | 9 | F5 | | 9 | D9 | CO | | E7 | IP1 | | C5 |
| | 2 | C8 | D | | C7 | | 10 | E8 | | 1,2 | E8 | | 1 | C5 |
| | 3 | F9 | | 1,2 | C8 | EXT | | C8 | | 3 | B8 | | 2 | B5 |
| | 4 | F4 | | 3,4 | C7 | | 1 | E8 | | 4 | B4 | IP2 | | C5 |
| SLA | | F9 | | 5 | F4 | | 2 | C9 | | 5 | D8 | | 1,2 | C5 |
| | 1 | E8 | | 6 | E5 | | 3 | G4 | | 6 | C8 | | 3 | B5 |
| | 2 | E5 | E | | D7 | | 4 | C8 | | 7 | F6 | IS1 | | D4 |
| | 3 | F4 | | 1,3 | E8 | | 5 | C8 | | 8 | C7 | | 1,2,3 | C4 |
| | 4 | C9 | | 2 | D7 | BSI | | D4 | | 9 | F6 | | 4 | B5 |
| | 5 | F4 | | 4 | F4 | | 1 | F4 | | 10,11 | E6 | | 5 | D5 |
| | 6 | G7 | | 5 | D8 | | 2 | E4 | | 12 | F3 | IS2 | | D5 |
| TR | | E7 | | 6 | E6 | | 3 | D6 | RET | | G4 | | 1,2 | C4 |
| | 1,2 | F7 | | 7,9 | G6 | | 4 | F4 | | | | | 3 | B5 |
| | 3,4 | G7 | | 8,10 | F6 | | | | | | | HBS | | C6 |
| | 5 | F6 | | 11 | G7 | | | | | | | | 1 | C6 |
| | 6,7 | E8 | | 12 | C6 | | | | | | | | 2 | B6 |
| | | | | 13,14 | D7 | | | | | | | | 3 | E5 |

FIG. 9

INVENTORS
L. K. ARMSTRONG
G. R. BERGQUIST
BY
Hoffman Stone
ATTORNEY

THREE-WAY CALLING AND CALL-WAITING ARRANGEMENTS FOR STEP-BY-STEP TELEPHONE SYSTEMS

BRIEF DESCRIPTION

Call-waiting and three-way calling services are known for telephone systems of the common control type, and are expected soon to be commercially available in many parts of the country. They greatly enhance the utility and convenience of the telephone at little added cost, and are expected to meet good market demand. A large number of telephone systems, however, are of the step-by-step and cannot make use of auxiliary equipment designed for systems of the common control type. The present invention provides these services in step-by-step systems.

The call-waiting service provides an audible signal to a subscriber while his telephone is in use, letting him know that another caller is trying to reach his station. The service enables the subscriber to switch alternately between the party he was initially connected to and the new caller, simply by depressing his hookswitch momentarily. The party he is not talking with at any moment is placed on hold. If the first party disconnects, the next caller appears in his place and the operation may be repeated.

Three-way calling enables a subscriber to establish a three-way conference call. He interrupts a call in progress at his station by momentarily depressing his hookswitch. The party at the other end of the line is automatically placed on hold and the subscriber is given dial tone. The subscriber then dials the desired third party. Once he has dialed the third party's number, he may set up the conference call at any time, either immediately, or after he has spoken privately with the third party, by another flash of his hookswitch. A third flash of his hookswitch disconnects the third party.

The services are equivalent to a key-set telephone at the subscriber's station, with two lines connecting him to the central office with bidirectional trunk hunting, and with the added advantage of enabling the subscriber to set up a three-way conference call.

Briefly, the invention contemplates relay trees including timed release and delayed pickup relays to accomplish the needed switching at the central office. The three-way calling circuit requires the use of an auxiliary line circuit and a second appearance in the linefinder bank for the subscriber's line. The call-waiting circuit requires a second appearance of the subscriber's line in the connector bank. The circuits may be used individually, or in combination, and electrical interlocks are provided to guard against ambiguous operation.

Three-way calling is under control of the subscriber, and during times when it is in use, the interlock connection inhibits the call-waiting relay tree, so that a subsequent caller is given busy tone. Similarly, the three-way calling relay tree is inhibited when the call-waiting circuit is in operation.

On the call-waiting service, when the subscriber's line is in use, an incoming call appears at the second appearance of the subscriber's line in the connector bank, and the caller continues to receive ring-back signals. He is not sent a busy tone, unless the subscriber is already handling two calls.

DETAILED DESCRIPTION

A presently preferred embodiment of the invention will now be described in detail in connection with the accompanying drawings, in which.

Figure 4:
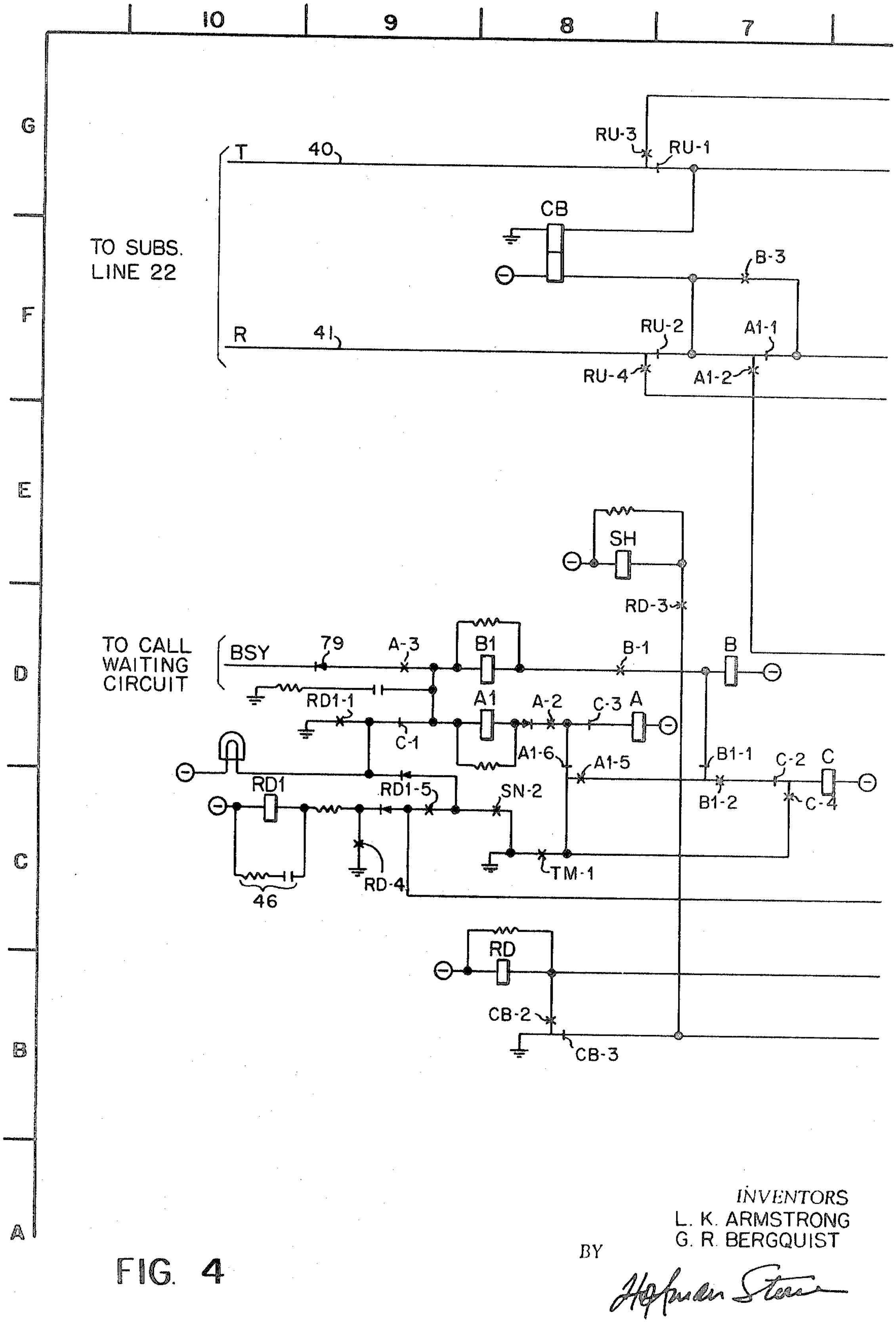
Figure 5:
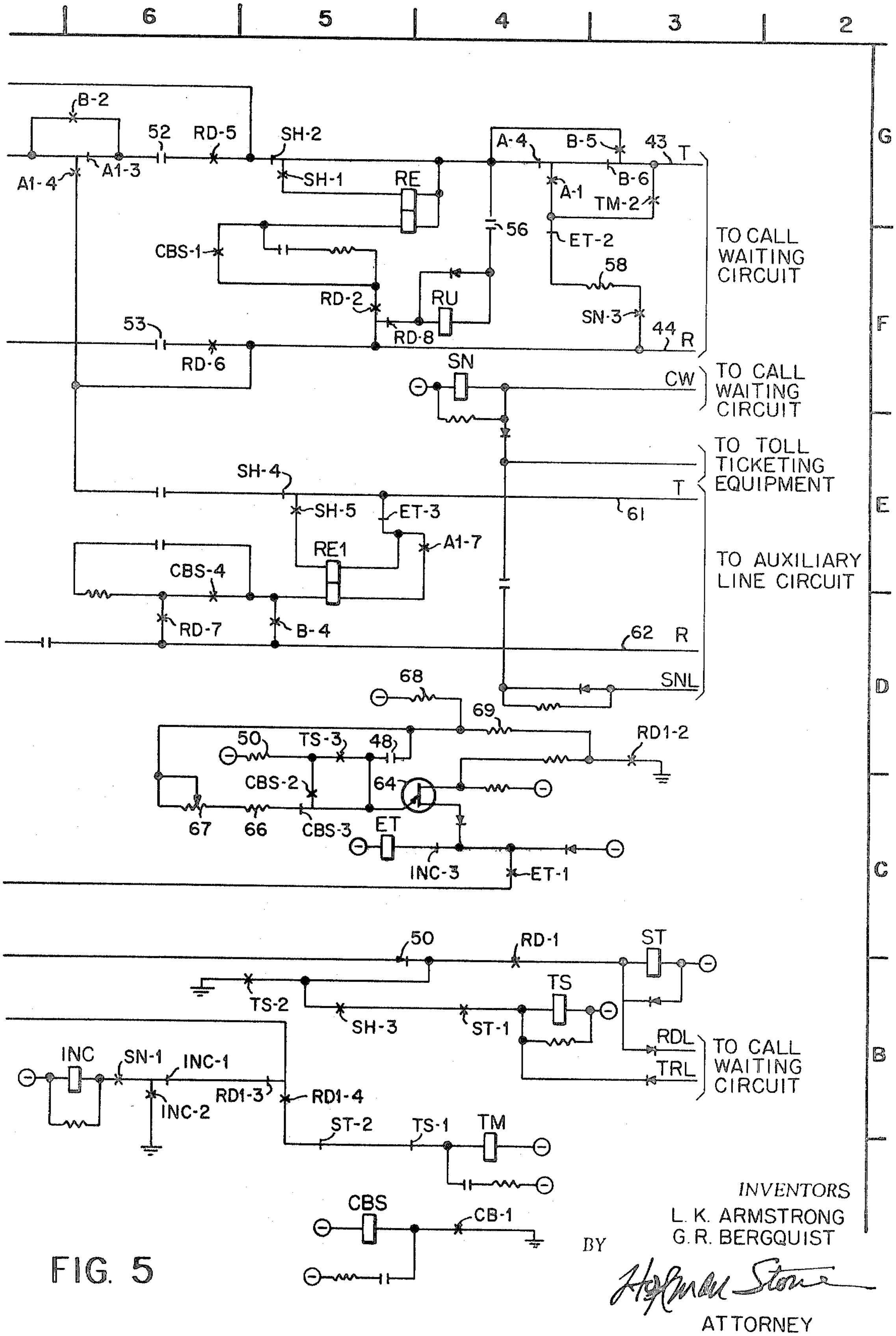
Figure 7:
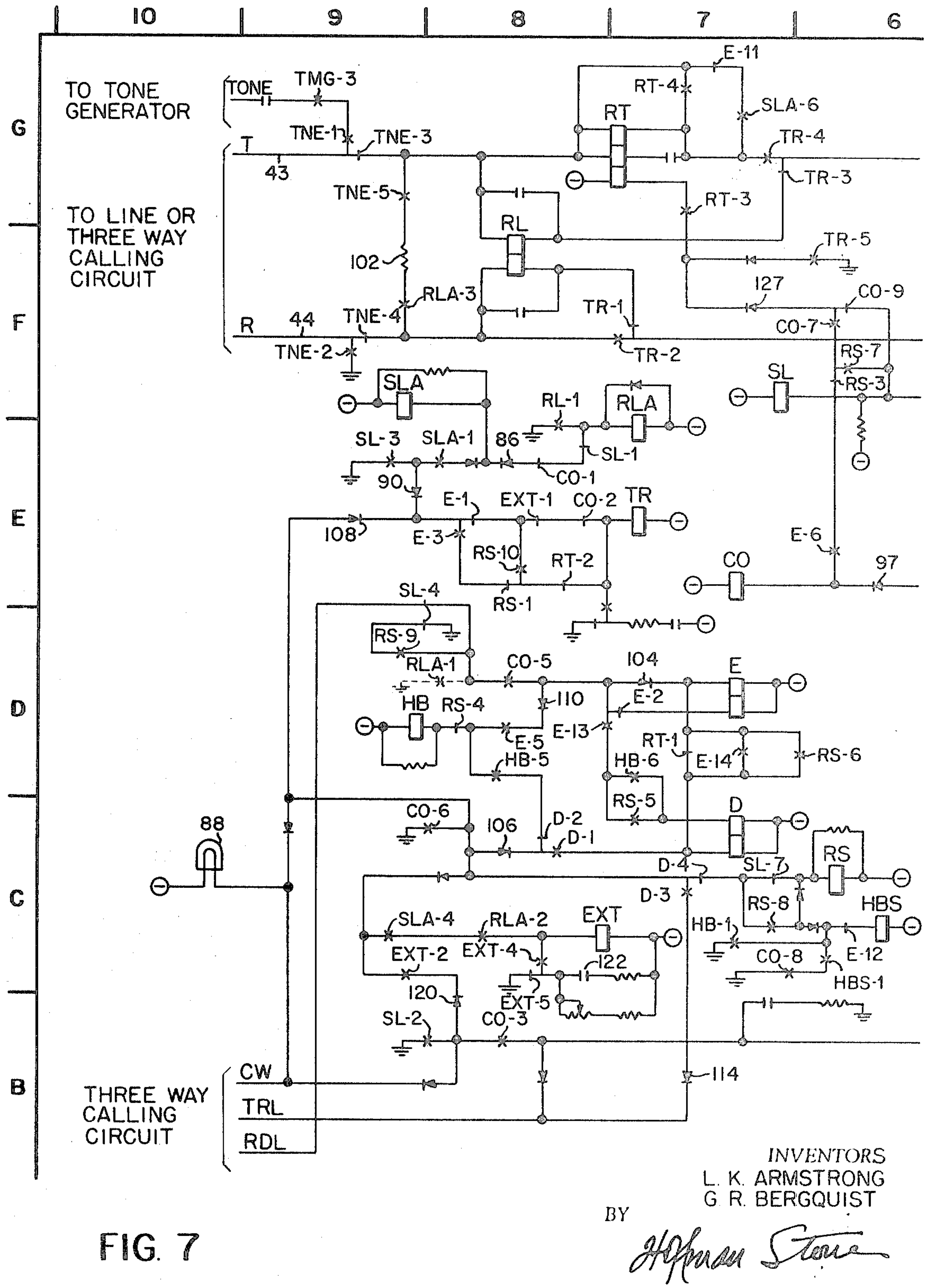
Figure 8:
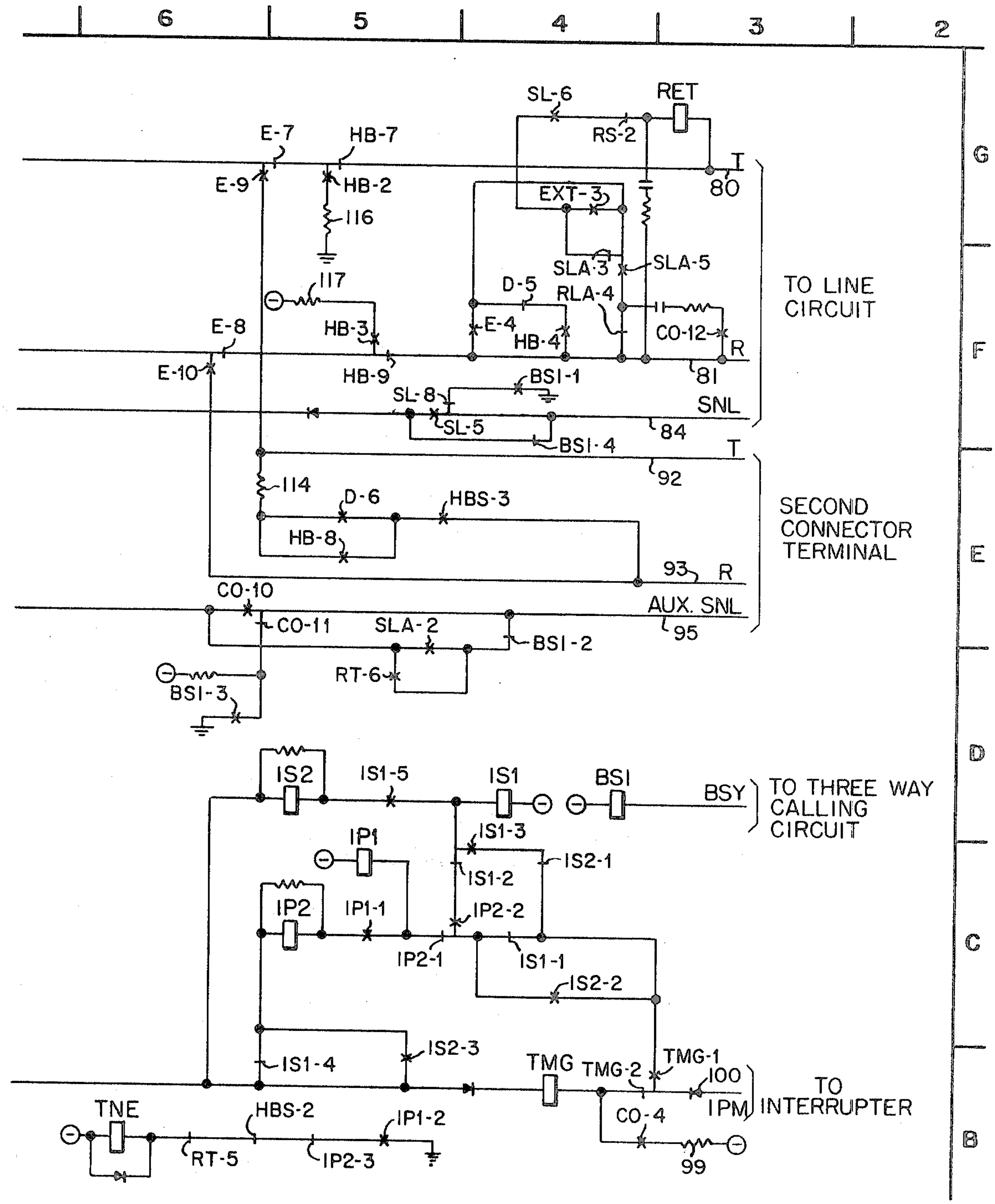

FIGS. 4 and 5, taken together, and juxtaposed with FIG. 4 to the left of FIG. 5 are a schematic circuit diagram of a three-way calling circuit according to the invention;

FIG. 6 is a chart showing the locations in terms of map coordinates of the windings and contacts of the various relays and coils in the circuit diagram of FIGS. 4 and 5;

FIGS. 7 and 8, taken together, and juxtaposed with FIG. 7 to the left of FIG. 8 are a schematic circuit diagram of call-waiting circuit according to the invention; and FIG. 9 is a chart showing the locations in terms of map coordinates of the windings and contacts of the various relays and coils in the circuit diagram of FIGS. 7 and 8.

SCHEMATIC BLOCK DIAGRAM

Figures 1, 2:
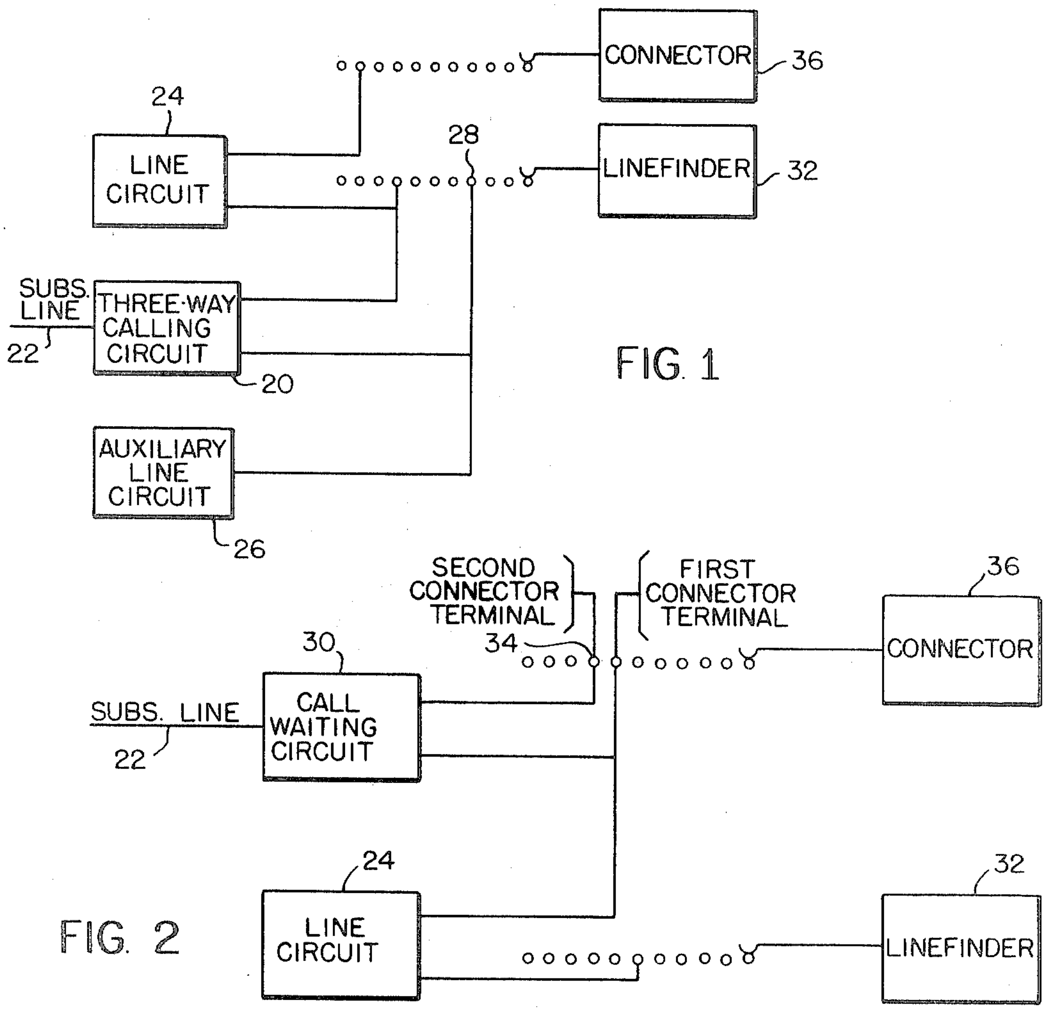
FIG. 1 is a schematic box diagram showing how the three-way calling circuit of the invention is connected into a conventional step-by-step telephone exchange.
FIG. 2 is a schematic box diagram showing how the call-waiting circuit of the invention is connected into a step-by-step telephone exchange.

As shown in FIG. 1, the three-way calling circuit 20 is connected between the subscriber's line 22 and its normal line circuit 24, and makes use of an auxiliary line circuit 26, which is generally similar to the normal line circuit 24, and a second appearance 28 in the linefinder bank 2.

As shown in FIG. 2, the call-waiting circuit 30 is connected between the subscriber's line 22 and his normal line circuit 24, and includes a second appearance 34 in the connector bank 36 of the exchange. The subscriber's line 22 reaches its line circuit 24 only through the call-waiting circuit 20.

Figure 3:
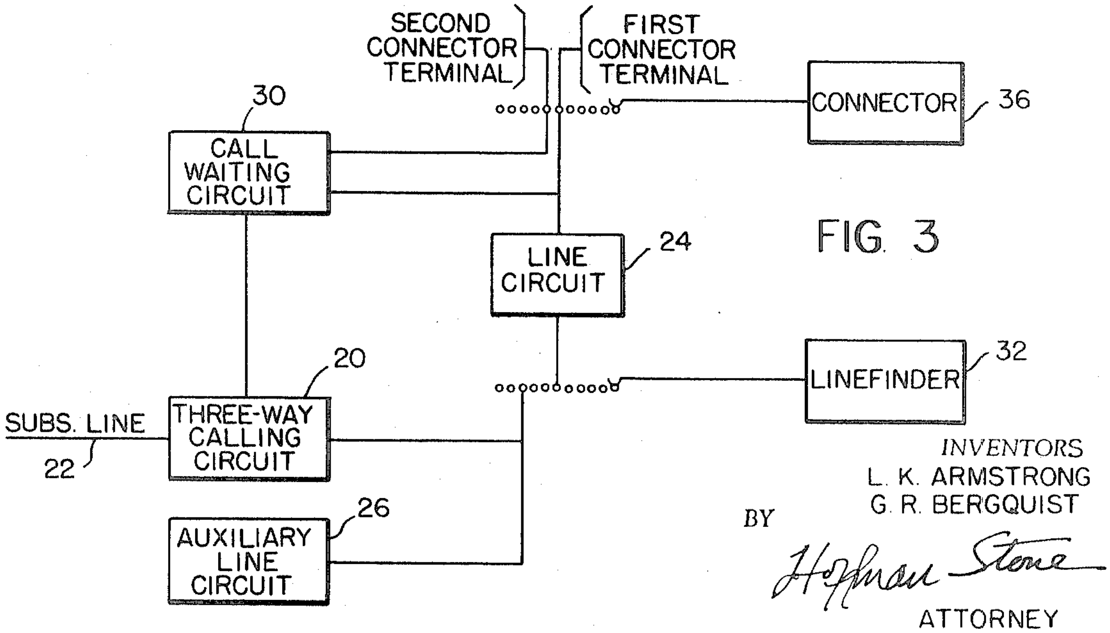
FIG. 3 is a schematic box diagram showing both the three-way calling and the call-waiting circuits connected to serve a subscriber's line in a step-by-step exchange.

When both call-waiting and three-way calling services are provided for the same line, the arrangement is as shown in FIG. 3. The subscriber's line 22 enters the exchange through the three-way calling circuit 20, and reaches its regular line circuit 24 through the three-way calling circuit 20 and the call-waiting circuit 30. The central office equipment has been modified from its conventional form by the addition of the three-way calling circuit 20, the call-waiting circuit 30, the auxiliary line circuit 26, and the second appearances 34 and 28 of the subscriber's line in the connector and line finder banks 36 and 32, respectively.

THREE-WAY CALLING CIRCUIT

The three-way calling circuit 20 includes 17 relays and two inductors connected as shown in FIGS. 4 and 5 between the incoming tip and ring leads 40 and 41 of the subscriber's line 22 and other equipment in the exchange. The circuit will be most readily understood through the following description of its operation, bearing in mind the functions that have been described hereinabove.

First, the circuit provides for seizure of the central office equipment and the subscriber's line for both incoming and outgoing calls in the regular way, and sets itself in readiness once a regular connection is established to enable the subscriber to set up a three-way conference call.

SEIZURE ON OUTGOING CALL

Seizure on an outgoing call is initiated by actuation of the battery feed relay CB in response to closure of the subscriber's hookswitch (not shown). The battery feed slave relay CBS picks up at this time in response to closing of the contacts CB–1 of the battery feed relay. Both the battery feed relay CB and the battery feed slave relay CBS are fast acting relays and follow dial pulses as dialed by the subscriber. Pickup of the battery feed relay CB also completes an energizing circuit through the contacts CB–2 to cause the release delay relay RD to pick up. Closing of the contacts CB–2 also provides a ground connection for energization of the start relay ST in response to closing of the contacts RD-1 of the release delay relay. The contacts CBS–1 of the battery slave relay and RD–2 of the release delay relay also close at this time to prepare the forward loop for subsequent dial pulsing. The contacts CBS–1 and RD–2 are connected in series with one winding of the retard coil RE across the forward going tip and ring leads 43 and 44, respectively.

Pickup of the release delay relay RD also closes the contacts RD–3 partially to enable the energization circuit for the shunt relay SH. Closing of the contacts RD–2 completes the forward loop through the outgoing tip and ring leads 43 and 44 to seize the line circuit 24. Closing of the contacts RD–4 completes the energizing circuit for the release delay slave relay RD1, which is shunted by an RC circuit 46 for delayed pick up and release.

Upon seizure, the line circuit, either directly, or through the call-waiting circuit as hereinafter described, grounds the sleeve lead CW and the sleeve relay SN operates.

Pick up of the release delay slave relay RD1 closes its contacts RD1-1 to connect the ground point into the toggle circuit, which includes the on hook/off hook toggle relays A, B, A1, and B1, and the on hook release relay C, preparing this circuit for eventual toggle-type operation in response to successive actuations of the subscriber's hookswitch. The contacts RD1–2 of the release delay slave relay close to charge a capacitor 48 (at map coordinates 5-C) in an extended timing circuit, the function of which will be described hereinafter.

Upon completion of the operations just described, the circuit is in condition to receive dialing pulses from the subscriber and transmit them to the line circuit through the forward going tip and ring leads 43 and 44. As stated hereinabove, the battery feed relay CB and the battery feed slave relay CBS are fast acting and follow the dial pulses as received from the subscriber. Alternate opening and closing of the contacts CBS–1 of the battery feed slave relay produce pulses on the forward going tip and ring leads 43 and 44 conforming to the pulses received from the subscriber on the incoming leads 40 and 41.

The release delay relay RD is a slow-to-release relay, having a release time of about 200 milliseconds. It does not follow the dial pulses, but once picked up, remains actuated during the dialing of each digit. The contacts CB-3 of the battery feed relay, therefore, cause the shunt relay SH also to operate and follow the dial pulses. The contacts SH–1 and SH of the shunt relay operate during dialing to shunt one-half of the retard coil RE and disconnect the outgoing tip lead 43 from the incoming tip lead 40 to reduce clicking noises on the line. The shunt relay SH is of the slow release type, having a release time significantly greater than the duration of a single dial pulse, so that it remains operated, or picked up during the dialing of each complete digit. It may drop out during inter digital pauses.

During dialing, the test relay TS also operates, being energized through the contacts ST–1 of the start relay, which is also of the slow-release type, the contacts SH–3 of the shunt relay, the diode 50, and the contacts CB–2 of the battery feed relay. After completion of dialing, the shunt relay SH drops out, closing its contacts SH–2 to complete the voice transmission path between the incoming tip and ring leads 40 and 41 and the forward going tip and ring leads 43 and 44. The contacts SH–1 now open to remove the shunt from across the second winding of the retard coil RE and restore its full impedance across the forward going tip and ring leads 43 and 44.

SEIZURE ON INCOMING CALL

Seizure on an incoming call is established in response to a ground connection placed on the sleeve lead CW in response to operation of the connector 36 (FIG. 2), causing the sleeve relay SN to pick up. Pickup of the sleeve relay SN completes the energizing circuit to pick up the incoming relay INC through the sleeve relay contacts SN–1, the normally closed contacts INC–1 of the incoming relay, the normally closed contacts RD1-3 of the release delay slave relay, and the normally closed contacts CB–3 of the battery feed relay. When the incoming relay INC picks up, it becomes self-holding through the contacts SN-1 of the sleeve relay and its own contact INC–2 and it remains picked up until the sleeve relay SN drops out. Pick up of the incoming relay INC also disables the extended timing circuit by its contacts INC–3 and thereby disabling the extended timing relay ET.

Ringing current is shunted around the coupling capacitors 52 and 53 by operation of contacts RU–1 RU–2 RU–3 and RU–4 of the ring-up relay RU, which is connected in series with a capacitor 56 across the outgoing tip and ring leads 43 and 44 to pick up in response to the application of ringing voltage between the tip and ring leads. When the subscriber answers, closing his hookswitch, the associated connector trips and the call is completed. The battery feed relay CB operates when the subscriber goes off hook, and the general sequence of relay operation hereinabove described in connection with seizure on an outgoing call takes place.

THREE-WAY CONFERENCE

Except for the operation of the extended timing circuit, which will be described in detail hereinafter, the operation of the circuit to establish a three-way conference is the same whether the call originated outgoing or incoming. The subscriber momentarily depresses his hookswitch. The battery feed relay CB and the battery slave relay CBS release. The shunt relay SH picks up, due to closing of the battery feed relay contacts CB–3. The start relay ST drips out, due to opening of the contacts CB–2 of the battery feed relay. Dropping of the start relay ST causes its contacts ST–2 to close, completing the energizing circuit to pick up the hookswitch time relay TM. The circuit extends through the normally closed contacts TS–1 of the test relay, the contacts ST–2 of the start relay, the contacts RD1–1 of the release delay slave relay, and the contacts CB–3 of the battery feed relay, which are all in series with the coil of the hookswitch time relay TM between battery and ground.

Pick up of the hookswitch time relay TM completes the energizing circuit for the first on hook relay A through closing of the contacts TM–1, and also, by closing of the contacts TM–2, connects a resistor 58 across the forward going tip and ring leads 43 and 44 to hold the original line circuit. Pick up of the first on hook relay A closes its contacts A–1, which are simply connected in shunt with the contacts TM–2 of the hookswitch time relay to insure keeping the original line circuit on hold even though the hookswitch time relay TM may momentarily drop out. The contacts A–2 of the first on hook relay also close providing a connection between the windings of the first on hook relay A and the first off hook relay A1 so that when the hookswitch time relay TM drops out, the relays A and A1 will be connected in series between the batter and ground and stay picked up pending opening of some other contacts. Closing of the contacts A–3 connects the busy lead BSY to ground to disable the call-waiting circuit.

The circuit then waits for the subscriber to go back off hook. If the original call was an incoming call, the circuit will stand by as long as the calling subscriber remains off hook, regardless of how long the local subscriber remains on hook. The circuit will release only in response to dropping of the sleeve relay SN, which occurs when the calling party goes back on hook removing ground from the sleeve lead CW. If the original call was placed by the local subscriber, that is, if it was an outgoing call, the circuit distinguishes between a hookswitch flash and termination of a call by means of the extended timing circuit, as described hereinafter, which causes the circuit to release when the subscriber stays on hook continuously for about 2 seconds or longer.

When the subscriber now goes back off hook, completing his hookswitch flashing signal, the battery feed relay CB and the battery feed slave relay CBS again pick up, and the start relay ST operates in response to closing of the contacts CB–2 of the battery feed relay. The hookswitch time relay TM drops out in response to opening of the contacts ST–2 of the start relay, and causes its contacts TM–1 to open, thereby removing the ground connection at the junction between the first on hook relay A and the first off hook relay A1, causing the relay A1 to pick up.

Actuation of the first off hook relay A1 disconnects the subscriber from the forward going tip and ring leads 43 and 44 to which he had been connected through opening of the normally closed contacts A1–1 and A1–3 It also connects the subscriber to the tip and ring leads 61 and 62 that lead to the auxiliary line circuit 26 (FIGS. 1 and 3) by closing of the contacts A1–2 and A1–4. The auxiliary line circuit 26 then operates in the normal way to seize the necessary central office equipment and return dial tone to the subscriber, who then dials the number of the desired third party.

After the subscriber dials the number of the third party, he may then establish a conference connection by again momentarily depressing his hookswitch. The sequence of relay operation is as follows.

When the subscriber goes back on hook by depressing his hookswitch, the battery feed relay CB and battery feed slave relay CBS drop out, deenergizing the release delay relay RD and the start relay ST by opening the contacts CB–2 of the battery feed relay. When the start relay ST drops, closing of its normally closed contacts ST–2 causes the hookswitch time relay TM to pick up, closing its contacts TM–1 to energize the second on hook relay B through a circuit including the normally closed contacts B1–1 of the second off hook relay B1, the contacts A1–5 of the first off hook relay A1, and the contacts TM–1 of the hookswitch time relay.

When the subscriber releases his hookswitch, the battery feed relay CB, the batter feed slave relay CBS, and the release delay relay RD all again operate as hereinabove described, and the hookswitch time relay TM drops out due to opening of the contacts CB–3 of the battery feed relay. Opening of the contacts TM–1 of the hookswitch time relay causes the second off hook relay B1 to pick up by removing the ground connection from the junction point between it and the second on hook relay B, placing the second off hook relay B1 in series with the second on hook relay B between battery and ground through a circuit that includes the contacts B-1 of the second on hook relay B, the contacts C-1 of the on hook release relay C, and the contacts RD1–1 of the release delay slave relay. All four of the on hook and off hook relays, A, A1, B and B1 are now picked up and remained picked up until the conference call is terminated.

Closing of the contacts B–2 and B–3 of the second on hook relay shunt the now held open contacts A1–1 and A1–3 of the first off hook relay partially to complete the connection between the subscriber's tip and ring leads 40 and 41 and both sets of forward going tip and ring leads 43 and 44, and 61 and 62. Closing of the contacts B–5 shunts the now held open contacts A–4 of the first on hook relay, and opening of the contacts B–6 opens the circuit through the contacts A–1 of the first on hook relay so that the holding resistor 58 will be disconnected from across the forward going tip and ring leads 43 and 44 when the hookswitch time relay drops. Closing of the contacts B–4 of the second on hook relay, in conjunction with closing of the contacts A1–7 of the first off hook relay connects one-half of the second retard coil RE1 across the tip and ring leads 61 and 62 leading to the auxiliary line circuit. Closing of the contacts B1–2 and A1–5 prepares the on hook release relay C for pickup in response to the next pickup of the hookswitch time relay TM. The circuit thus remains with all four of the toggle relays A, A1, B, and B1 picked up pending the next actuation of the subscriber's hookswitch, and the conference call is set up.

The next time the subscriber depresses his hookswitch, either momentarily or as in hanging up, the connection to the third party through the auxiliary line circuit 26 is broken, and the circuit reverts to its normal condition, ready for the initiation of a second third party call. When the hookswitch opens, the battery feed relay CB and the batter feed slave relay CBS once again drop out. The release delay relay is deenergized by opening of the contacts CB–2 of the battery feed relay, and drops about 200 milliseconds later. The shunt relay SH, which is also a slow-release relay, picks up due to closing of the contacts CB–3 of the battery feed relay, and remains picked up until about 200 milliseconds after the release delay relay drops, opening the contacts RD–3. The start relay ST is also deenergized by opening of the contacts CB–2 of the battery feed relay, and drops after a relatively short delay. Dropping of the start relay ST completes the circuit to pick up the hookswitch time relay TM by reason of closing of the contacts ST–2, the circuit being completed through the contacts TS–1 of the test relay, the held closed contacts RD–3 of the release delay slave relay, and the now closed contacts CB–3 of the battery feed relay.

Pickup of the hookswitch time relay TM at this time energizes the on hook release relay C by closing of the contacts TM–1, the circuit being completed through the normally closed contacts C–2 of the off hook release relay, the held closed contacts B1–2 of the second on hook relay, the held closed contacts A1–5 of the first off hook relay, and the contacts TM–1. Picking up of the off hook release relay C deenergizes all of the toggle relays A, A1, B, and B1, by opening of the normally closed contacts C1 and C3. Closing of the contacts C–4 of the on hook release relay completes the circuit to keep the on hook release relay C picked up so long as the hookswitch time relay TM remains picked up.

The circuit will remain in this condition, with the on hook release relay C, the hookswitch time relay TM, and the release delay slave relay RD1 all picked up so long as the subscriber remains on hook and a ground signal remains on the sleeve lead CW. When the switch train through the main line circuit including the forward going tip and ring leads 43 and 44 drops, the ground connection to the sleeve lead CW is disconnected and the sleeve relay SN drops, opening its contacts SN–2, thereby deenergizing the release delay slave relay RD1, which in turn causes the hookswitch time relay TM and the on hook release relay C to drop by opening of the contacts RD1–4 and TM–1.

If, after depressing his hookswitch to drop the third party from the auxiliary line circuit, the subscriber then goes off hook immediately, the release delay relay RD again picks up due to closing of the contacts CB–2 of the battery feed relay. The hookswitch time relay TM drops out by reason of opening of the contacts CB–3, and the on hook release relay C drops out by reason of opening of the contacts TM–1 of the hookswitch time relay. The circuit is then in condition for the initiation of another third party call.

EXTENDED TIMING

In step-by-step telephone switching systems, the switch train drops in response to the calling subscriber's going on hook. So long as he remains off hook, the connection between the parties is held. Accordingly, the three-way circuit of the invention includes means for distinguishing between incoming and outgoing calls, and for dropping the switch train when the subscriber goes on hook upon termination of an outgoing call. The arrangement includes a timing circuit providing a delay of about 2 seconds to insure against tripping in response to a momentary hookswitch signal.

The incoming relay INC picks up at the start of an incoming call as hereinabove described, but does not pick up for an outgoing call, because, on an outgoing call, the release delay slave relay RD1 picks up, opening its contacts RD1–3 before the sleeve relay SN picks up. So long as the incoming relay INC is not picked up, the extended timing relay ET remains enabled, because the contacts INC–3 remain closed.

The extended timing relay ET is connected to be triggered by a unijunction transistor 64, which in turn, is connected to be triggered by an RC timing circuit including the capacitor 48, a fixed resistor 66, and an adjustable resistor 67. During the call, the unijunction transistor 64 is held cutoff by the application of substantially full battery voltage to its gate electrode through a limiting resistor 50 and the contacts CBS–2 of the battery feed slave relay. One terminal of the capacitor 48 is connected to the midpoint of a voltage divider, which includes the resistors 68 and 69, and is connected across the battery terminals through the contacts RD1-2 of the release delay slave relay. The opposite terminal of the capacitor 48 is connected to the gate of the unijunction transistor 64 and, during a call, to the negative battery terminal through the limiting resistor 50, and the contacts CBS-2 of the batter feed slave relay.

When the subscriber goes on hook, terminating a call that he originated, the battery feed slave relay CBS drops immediately after the battery feed relay CB drops, as hereinabove described, opening its contacts CBS-2 and closing its contacts CBS-3 to connect the timing resistors 66 and 67 directly across the capacitor 48 to discharge it. The value of the adjustable resistor 67 is adjusted to insure firing of the unijunction transistor 64 about 2 seconds after the subscriber goes on hook. Thus, the extended timing relay ET will not operate in response to a momentary actuation of the hookswitch, but only upon termination of a call.

When the extended timing relay ET picks up, it closes its self-holding contacts ET-1 and opens its contacts ET-2, which latter contacts are in series with the hold resistor 58 across the forward going tip and ring leads 43 and 44. Opening of the contacts ET-2 of the extended timing relay, together with opening of the contacts CBS-1 of the battery feed slave relay, breaks the DC connection between the forward going tip and ring leads 43 and 44, thereby releasing the switch train. A third pair of contacts ET–3 of the extended timing relay also appear across the forward going tip and ring leads 61 and 62 leading to the auxiliary line circuit, and these contacts ET–3 open when the extended timing relay ET picks up to insure disconnect of the third party call, if one is in progress. When the switch train drops, ground is removed from the sleeve lead CW, causing the sleeve relay SN to drop, thereby dropping the extended timing relay ET by opening of the contacts SN–2. Opening of the contacts SN–2 also causes the release delay slave RD1 to drop, and the circuit returns to its quiescent state.

Diodes, capacitors, and resistors are distributed as shown throughout the circuit in accordance with conventional practice for suppression of arcing and contact bounce, and will not be described in detail herein, because they do not determine the sequence of operation, but only minimize the effects of transient voltages and currents to insure smooth, positive operation. In addition, operation of certain of the relay contacts has not been explicitly set forth because their functions are thought to be obvious in view of the circuit diagram and not essential to an understanding of the invention.

CALL-WAITING

Referring now to FIGS. 7, 8, and 9, the call-waiting circuit according to the invention includes 20 relays as listed in the drawing and a retard coil RE interconnected with each other and between the subscriber's line and operating components of the central exchange. The incoming tip and ring leads may be, as shown, the leads 43 and 44 from the three-way calling circuit, or, if the subscriber does not subscribe to the three-way calling circuit, the incoming tip and ring leads designated 43 and 44 would be the actual line leads 40 and 41 themselves. The forward going tip and ring leads 80 and 81, respectively, are connected in the regular way to the subscriber's regular line circuit. During times when the circuit is not in use, the incoming tip and ring leads 43 and 44 are connected respectively to the forward going tip and ring leads 80 and 81 through the operating coils of a reclose loop relay RL, and battery voltage appears across the forward going tip and ring leads 80 and 81, being applied from the line circuit.

SEIZURE BY THE SUBSCRIBER (OUTGOING CALL)

When the subscriber goes off hook to place an outgoing call, his hookswitch closes, closing a direct current conductive loop across the tip and ring leads 43 and 44, and thereby causing the reclose loop relay RL to pick up. Closing of the loop also seizes the line circuit, which thereupon connects the sleeve lead 84 to ground, causing the sleeve relay SL also to pick up. Actuation of the reclose loop relay RL closes the contacts RL–1 to pick up the slave relay SLA, the circuit being completed through a diode 86, the normally closed contacts CO–1 of a cutoff relay, and the normally closed contacts SL–1 of the sleeve relay. Closure of the contacts RL–1 of the reclose loop relay also completes the energizing circuit to pick up the reclose loop assist relay RLA.

Picking up of the sleeve relay SL-2, closes its contacts SC-2 the first effect of which is to complete a circuit to energize a signal lamp 88 for the convenience of maintenance personnel to indicate to them that the circuit is in use. The transfer relay TR also picks up in response to actuation of the sleeve relay SL, through closing of the contacts SL–3, the circuit being traced through the second contacts CO–2 of the cutoff relay, the first contacts EXT–1 of an extended time relay, the contacts E–1 of yet another relay called the second toggle relay E, a diode 90, and the contacts SL–3. Closing of the contacts SL–3 also provides a holding circuit for the slave relay SLA through the contacts SLA–1 so that the slave relay SLA stays picked up despite the opening of the first contacts SL–1 of the sleeve relay.

Closure of the contacts SL–2 grounds the lead CW to actuate the sleeve relay SN in the three-way calling circuit, and also partially completes the ground path for the transfer lead TRL. Opening of the contacts SL–4 prepares the circuit for the eventual application of a signal to the release delay lead RDL. Closure of the contacts SL–5 provides a positive connection between the coil of the sleeve relay SL and the sleeve lead 84 connected to the line circuit.

When the transfer relay TR picks up, its contacts TB–2 and TR–4 close to complete direct metallic connections between the incoming tip and ring leads 43 and 44 and the forward going tip and ring leads 80 and 81, respectively. The contacts TR–1 and TR–3 also open at this time, to disconnect the reclose loop relay RL from the circuit, causing it and the reclose loop assist relay RLA to drop out. The subscriber may now dial and establish his call, and the circuit remains in this condition, with the sleeve relay SL, the slave relay SLA, and the transfer relay TR picked up, pending termination of the call or the appearance of an incoming call-waiting call.

If the call is simply terminated, opening of the subscriber's hookswitch opens the loop through the line circuit, which thereupon disconnects the sleeve lead 84 from ground, causing the sleeve relay SL to drop. Dropping of the sleeve relay SL causes dropping of the slave relay SLA and the transfer relay TR by opening of the contacts SL–3.

If, on the other hand, a third party tries to reach the subscriber while the first call is in progress, the new call is connected by the connector bank to the auxiliary tip and ring leads 92 and 93, respectively, and the auxiliary sleeve lead 95 is grounded at the connector bank in the usual way, completing an energizing circuit for the cutoff relay CO through a diode 97, the now closed contact SLA–2 of the slave relay, and the normally closed contact BSI–2 of the busy relay, causing the cutoff relay to pick up.

Pickup of the cutoff relay CO releases the transfer relay TR by opening of the contacts CO–2, reestablishing the subscriber's line loop through the reclose loop relay RL, causing the reclose loop relay RL and the reclose loop assist relay RLA to pick up. Pickup of the cutoff relay CO also causes its contacts CO–3 and CO–4 to close, thereby completing the energizing circuit for the timing relay TMG through the already closed contacts SL–2 of the sleeve relay and through a limiting resistor 99.

The interrupter circuit of the exchange, which produces ground pulses of about one-quarter second duration at intervals of about 6 seconds, is connected to the energizing circuit for the timing relay TMG through the interrupter lead IPM, a diode 100, and the normally closed contacts TMG–2 of the timing relay to condition the circuit so that it cannot cause the timing relay TMG to pick up during one of the interrupter ground pulses. The timing relay TMG, therefore, picks up during one of the intervals between the interrupter pulses, and initiates operation of the interrupter relays IP1, IP2, IS1, and IS2 to send call-waiting warning signals to the subscriber.

OPERATION OF THE INTERRUPTER TIMING CIRCUIT

The interrupter circuit of the exchange produces ground pulses of about one-quarter second duration at a rate of 10 pulses per minute. If the cutoff relay CO picks up during one of the quarter-second ground pulses from the interrupter circuit, both terminals of the timing relay TMG are grounded, the battery voltage appears across the limiting resistor 99, and pickup of the timing relay TMG is delayed until the end of the interrupter pulse. Once the interrupter pulse ends, the lead IPM to the interrupter circuit is disconnected from ground, and the timing relay TMG immediately picks up, closing its contacts TMG–1 and opening its contacts TMG–2. The timing relay TMG thereafter remains picked up for the duration of the call, until either the sleeve relay SL drops, opening its contacts SL–2, or the cutoff relay CO drops, opening its contacts CO–3 and CO–4.

Upon the occurrence of the first interrupter pulse subsequent to pickup of the timing relay TMG, the first interrupter relay IP1 is picked up by grounding of the interrupter lead IPM, the circuit being completed through the normally closed contacts TP2–1 of the second interrupter relay, the normally closed contacts ISI–1 of the first interrupter slave relay IS1, the now held closed contacts TMG–1 of the timing relay, and the diode 100. At the end of the interrupter ground pulse, the first and second interrupter relays IP1 and IP2 are connected in series between the battery terminal and ground through the now closed contacts IPI–1 of the first interrupter relay, and both of the interrupter relays IP1 and IP2 remain picked up until the occurrence of the next succeeding interrupter ground pulse.

During the first interrupter ground pulse, while the first interrupter relay IP1 was operated, closure of its contacts IPI–2 completed the energizing circuit for the tone relay TNE to apply an intercept tone to the subscriber's line through closing of the contacts TNE–1 and TNE–2 Simultaneously, the contacts TNE–3 and TNE–4 opened to disconnect the incoming tip and ring leads 43 and 44 from the forward going tip and ring leads 80 and 81 so that the intercept tone was not heard by the second party. Also, the contacts TNE–5 closed to connect a resistor 102 across the forward going line loop to hold the connection. The second party, the one connected to the forward going tip and ring leads 80 and 81, noticed clicks and a quarter-second interruption of his conversation, but was otherwise unaware of the call-waiting service.

The first and second interrupter relays IP1 and IP2 remain picked up until the occurrence of the second interrupter pulse following pickup of the timing relay TMG. When the second pulse occurs, the first interrupter slave relay ISI is picked up, the circuit being traced through the normally closed contacts ISI–2, the now closed contacts IP2–2, the normally closed contacts ISI–1, the now closed contacts TMG–1, and the diode 100. Once picked up, the interrupter slave relay IS1 is held picked up through an alternate path including the normally open contacts ISI–3, and the normally closed contacts IS2–1 of the second interrupter slave relay. In addition, the contacts ISI–4 of the first interrupter slave relay open to break the energizing circuit for the first and second interrupter relays IP1 and IP2, respectively, allowing them to drop out.

Upon termination of the second interrupter pulse, the first and second interrupter slave relays IS1 and IS2 are connected in series between the battery terminal and ground through the now closed contacts IS1-5 of the first interrupter slave relay, and the two interrupter slave relays IS1 and IS2 remain picked up for the duration of the call-waiting call.

Upon the occurrence of the third interrupter pulse, the first and second interrupter relays IP1 and IP2 operate in the same sequence as hereinabove described with respect to their response to the first interrupter pulse, and cause the tone relay TNE to be actuated for the duration of the third interrupter pulse to send a second intercept tone signal to the subscriber. At the end of the third interrupter pulse, the interrupter relays IP1 and IP2 are again connected in series across the battery, and remain picked up for the duration of the call-waiting call. There is no further response by the interrupter relays IP1 and IP2, nor by the interrupter slave relays ISI and IS2 to further ones of the interrrupter pulses. The contacts IP–1 are open, isolating the interrupter relays IPI and IP2 from the interrupter pulses and insuring the connection of the two relays in series across the battery. Similarly with the interrupter slave relays IS1 and IS2, opening of the contacts IS2–1 and IS1–2 isolates the interrupter slave relays IS1 and IS2 from the interrupter pulses.

The subscriber has now received two signals in the form of short bursts of intercept tone to indicate to him that a third party is trying to reach his line. It is now up to the subscriber to depress his hookswitch momentarily, otherwise the third party will continue to receive ringback tone and it will appear to him that either no one is home or the subscriber simply does not answer his telephone.

CALL-WAITING ANSWER

After the subscriber makes whatever explanation he wishes to the second party, to whom he has been talking, he momentarily depresses his hookswitch to place the second party on hold and to connect himself to the third party through the call-waiting circuit. The action of the circuit is as follows:

At the time the cutoff relay CO operated in response to seizure by the incoming call-waiting call, both windings of the differentially wound toggle relay E were energized, producing no mechanical effect on the relay. The circuit is traced from the battery terminal through the upper winding to the diode 104, and through the lower winding and the contacts E–2 of the toggle relay, then through the contacts CO–5 to the release delay lead RDL, which is connected to ground in the three-way calling circuit so long as the reclose loop relay RL and the reclose loop assist relay RLA are picked up in the call-waiting circuit. In the event the call-waiting circuit is used without the three-way calling circuit, the ground on the release delay lead RDL is not available, and, as indicated in dashed lines, the energizing circuit for the toggle relay E is completed through an extra contact RLA–1 of the reclose loop assist relay.

The lower winding of the other toggle relay D is also energized in response to closure of the contacts CO–5 of the cutoff relay, the circuit being completed through the normally closed contacts RT–1 of the ring trip relay RT and diode 104. The toggle relay D then picks up since only one of its windings is energized and is held up by closing of its contacts D–1, which completes a ground connection through a diode 106 and the now picked up contacts CO–6 of the cutoff relay.

The toggle circuit is thus conditioned by picking up of the cutoff relay CO, and now, when the subscriber goes on hook by depressing his hookswitch, the reclose loop relay RL and the reclose loop assist relay RLA are deenergized and drop out, removing the ground connection from the release delay lead RDL, thereby causing the toggle relay E to pick up. This is brought about because removal of the ground from the release delay lead RDL deenergizes the lower winding of the relay E, but the upper winding still retains a ground connection through the contacts RT–1 of the ring trip relay, the now closed contacts D–1 of the lower toggle relay D, the diode 106, and the contacts CO–6 of the cutoff relay.

Pickup of the toggle relay E completes an energizing circuit for the transfer relay TR through the normally closed contacts RT–2 of the ring trip relay the normally closed contacts RS–1 of the reseizure relay RS, the now closed contacts E–3 of the toggle relay, the diode 108, and the contacts CO–6 of the cutoff relay. Closure of the contacts E–4 of the toggle relay connects the retard coil RET across the forward going tip and ring leads 80 and 81 to place the original call on hold. This circuit may be traced from the tip lead 80 through the retard coil RET, the normally closed contacts RS–2 of the reseizure relay, the now closed contacts SL–6 of the sleeve relay, the normally closed contacts SLA-3 of the slave relay SLA, and the contacts E-4 of the toggle relay.

The contacts E-5 of the toggle relay also close at this time to connect the hold batter relay HB to the release delay lead RDL through the contacts CO-5 of the cutoff relay, and the diode 110, so that the hold battery relay HB will operate when the release delay lead RDL is again connected to ground. The contacts E-6 also close partially to complete the self-holding circuit for the ring trip relay RT. In addition, the contacts E-7 and E-8 open to disconnect the subscriber's leads 43 and 44 from the normal forward going leads 80 and 81, and the contacts E-9 and E-10 close to connect the subscriber's line 43, 44 to the forward going call-waiting line 92, 93. Lastly, the contacts E-11 open to release the shunt around the ring trip relay RT so that it will trip in response to a ring signal applied from the forward going call-waiting line 92, 93.

When now the subscriber goes back off hook by releasing his hookswitch, the ring trip relay RT picks up, completing a path for its self-holding winding through its own contacts RT-3, a diode 127, the now closed contacts CO-7, the normally closed contacts RDS-3 of the reseizure relay, and the now closed contacts E-6 of the upper toggle relay. Simultaneously, the trip windings of the ring trip relay RT are shunted by closing of the contacts RT-4. In addition, the contacts RT-5 of the ring trip relay open, to inhibit the tone relay TNE, and opening of the contacts RT-2 of the ring trip relay deenergizes the transfer relay TR causing it to drop, opening its contacts TR-2 and TR-4 and closing its contacts TR-1 and TR-3. This removes the shunt from around the reclose loop relay RL, and reinserts the relay RL in the voice signal path.

Transfer of the loop to the path through the reclose loop relay RL causes it to pick up in response to energizing currents applied from the second connector terminal through the forward going tip and ring leads 92 and 93, and the reclose loop assist relay RLA also picks up.

Pickup of the reclose loop assist relay RLA at this time causes the hold batter relay HB to pick up by the application of ground, either on the release delay lead RDL, or directly through the contacts RLA-1, if the three-way calling circuit is not in use.

The subscriber is not connected to talk to the call-waiting caller, and the first party remains on hold pending a subsequent actuation of the subscriber's hookswitch.

RETURN TO ORIGINAL CALL

The subscriber may now return to his original call, that is, connect himself to the forward going tip and ring leads 80 and 81, and place the call-waiting caller on hold by again momentarily depressing his hookswitch. The circuit operation is as follows:

When the subscriber goes on hook, the reclose loop and the reclose loop assist relays RL and RLA release, removing the ground connection from the release delay lead RDL, and thereby deenergizing the upper winding of the upper toggle relay E, causing it to drop. Dropping of the upper toggle relay E opens its contacts E-6, causing the ring trip relay RT to drop by removing its ground connection. Release of the upper toggle relay E also closes its contacts E-12 to cause the hold battery slave relay HBS to pick up, the circuit being completed through the contacts HB-1 of the hold battery relay. Once the hold battery slave relay HBS is picked up, it is held up despite release of the hold battery relay HB by a bypass circuit through the contacts HBS-1 of the hold battery slave relay and the contacts CO-8 of the cutoff relay, Actuation of the hold battery slave relay HBS disables the tone relay TNE by opening of the contacts HBS-2, and closing of the contacts HBS-3 connects a holding resistor 114 across the call-waiting party's tip and ring leads 92 and 93. When the subscriber then completes his hookswitch flash signal, once again going off hook, the reclose loop and the reclose loop assist relays RL and RLA both pick up, as hereinabove described, except that supplemental current is supplied to operate the reclose relay RL to compensate for the drain on the supply from the line circuit due to the connection of the retard coil RE across it at this time. The extra current is supplied through limiting resistors 116 and 117 through the contacts HB-2 and HB-3 of the hold battery relay. Actuation of the reclose loop and reclose loop assist relays RL and RLA causes the release delay lead RDL again to be connected to ground, thereby energizing the lower winding of the lower toggle relay D through the normally closed RT-1 of the ring trip relay, the diode 104, and the closed contacts CO-5 of the cutoff relay. The lower toggle relay D accordingly picks up since its upper winding is held open circuited due to the open contact E-13 of the upper toggle relay E. Pickup of the lower toggle relay D opens its contacts D-2, causing the hold battery relay HB to drop. Subsequent hookswitch flashes alternately hold one connection and connect the subscriber to the other.

EXTENDED TIMING

The extended timing relay EXT is arranged to measure a timing interval of about 2 seconds to enable the circuit to distinguish between a momentary hookswitch actuation and call termination in cases where the original call was initiated by the subscriber. This is desirable because in most step-by-step telephone switching systems control of the switch train is subject to the calling subscriber's local station. The switch train remains latched up until the calling subscriber terminates by going on hook. When the original call, therefore, was outgoing, and the subscriber wishes to drop the originally called party and continue his conversation with the call-waiting caller, he must depress his hookswitch and remain on hook for at least the approximately 2 second interval required to drop the extended timing relay EXT. The call-waiting call is always an incoming call, and it remains connected so long as the call-waiting caller stays off hook.

The extended timing relay EXT picks up on an outgoing call in response to closing of the contacts RLA-2 of the reclose loop assist relay, the contacts SLA-4 of the slave relay, and the contacts CO-6 of the cutoff relay immediately after an incoming call-waiting call is detected by operation of the cutoff relay CO. It is thereafter held operated through its own holding contacts EXT-2, the diode 120, and the held closed contacts SL-2 of the sleeve relay.

When the subscriber next goes on hook the reclose loop assist relay RLA drops, opening its contacts RLA-2, and thus breaking the energizing circuit for the extended timing relay EXT. A large capacitor 122 is connected in shunt with the winding of the extended timing relay EXT and provides enough current to hold the extended timing relay EXT up for the required interval of about 2 seconds. So long as the extended timing relay EXT remains held up, its contacts EXT-3 remain closed, keeping the retard coil RET connected across the forward going tip and ring leads 80 and 81 to hold the switch train up. When the extended timing relay drops, its contacts EXT-3 open, leaving an open circuit across the tip and ring leads 80 and 81, thus providing a disconnect signal to drop the switch train reaching to the originally called subscriber. When the switch train drops, the line circuit disconnects the sleever lead 84 from ground, thereby causing the sleeve relay SL to drop and leaving the subscriber's line circuit in condition to respond to subsequent incoming call. When the subscriber releases his hookswitch after the interval of about 2 seconds, he is again connected by operation of the toggle relays D and E, as hereinabove described, to the call-waiting caller through the second connector terminal. If and when a subsequent caller tries to reach the subscriber, he will appear at the line circuit as a new call-waiting call, and the sequence of operations will be repeated.

SEIZURE ON INCOMING ORIGINAL CALL

On an original incoming call, when the line circuit is seized by the signal from the connector bank, it applies a ground on the sleeve lead 84 to actuate the sleeve relay SL. Actuation of the sleeve relay closes its contacts SL–3 to pick up the transfer relay TR. When the transfer relay picks up, actuation of its contacts TB–1, TR–2, TR–3, and TR–4 connects the forward going tip and ring leads 80 and 81 to the subscriber's tip and ring leads 43 and 44 through the ring trip relay RT, shunting the reclose loop relay RL. When the subscriber goes off hook, the ring trip relay operates and is held operated by its bottom winding, which is then connected to the sleever lead 84 through the contacts RT–3, the diode 127, and the contacts CO–9. The ring trip relay RT remains held up until a call-waiting call appears on the auxiliary tip and ring leads 92 and 93 and the cutoff relay CO is actuated.

Except for the operation of the extended timing relay EXT, the circuit operates on incoming original calls in substantially the same manner as hereinabove described in connection with the operation of the circuit on an originally placed outgoing call.

BUSY INTERLOCK ARRANGEMENT

To avoid ambiguity in operation when the subscriber's line is served with both the three-way calling and the call-waiting services, it is desirable to inhibit the call-waiting circuit when a three-way call is in progress, and, similarly, to inhibit the three-way calling circuit during times when the call-waiting feature is in use. In the call-waiting circuit the busy relay BSI is connected to the three-way calling circuit for actuation whenever a three-way call is underway. At these times, the release delay slave relay RD1 and the first on hook relay A are picked up, and the on hook release relay C is not actuated (FIG. 4). The energizing circuit for the busy relay BSI is then completed through the contacts RD1–1, C–1, and A–3, and the diode 79. When the busy relay BSI operates, it places a ground connection through its contacts BSI–1 or BSI–3 on the one of the sleeve leads 84 and 95 that is not in use at the time. The contacts BST–2 and BSI–4 open at this time to prevent operation of the sleeve relay SL or the cutoff relay CO. Connecting the appropriate sleeve lead 84 or 95 to ground causes the connector to find that both terminals of the subscriber's line are busy, and the incoming caller is connected to the busy tone generator.

Conversely, when the call-waiting feature is in operation, the three-way calling circuit is inhibited. This is done by grounding the transfer lead TRL through the contacts CO 3 of the cutoff relay and SL–2 of the sleeve relay (FIG. 7), both of which relays are picked up during times when the call-waiting circuit is in use. Ground on the transfer lead TRL picks up the test relay TS in the three-way calling circuit, opening its contacts TS–1 to hold the timing relay TM deenergized. So long as the timing relay TM remains deenergized, its contacts TM–1 remain open, the on hook toggle relay A cannot pick up, and the three way calling circuit cannot transfer the subscriber's connection to the auxiliary tip and ring leads 61 and 62.

Provision is also made to prevent the three-way calling circuit from setting up for a three-way call in response to a hookswitch signal intended to drop an outgoing call and transfer to a call-waiting call, in which case the sleeve relay SL of the call-waiting circuit may be dropped for an extended period, with its contacts SL–2 open. During this time, ground is maintained on the transfer lead TRL through a shunt circuit including a diode 114, the held closed contacts D–3 of the first toggle relay, and the contacts CO–6 of the cutoff relay.

Upon completion of the signal, when the subscriber goes off hook, the toggle relay D releases, opening its contacts D–3, and thereby releasing the transfer lead TRL from ground. Subsequent hookswitch signals are then effective to operate the three-way calling circuit, enabling the subscriber to set up a conference call with the call-waiting caller as one party.

RESEIZURE

When the original party is disconnected, either when he hangs up in the case when the original call was incoming to the subscriber, or when he is disconnected by the 2-second on hook signal from the subscriber, and when the subscriber is thereafter continuing his call on the auxiliary call-waiting line through the tip and ring leads 92 and 93, the reseizure relay RS operates in response to dropping of the sleeve relay SL and the consequent closing of the contacts SL–7, which connects the winding of the seizure relay RS to ground through the normally closed contacts D–4 of the lower toggle relay D, and the now closed contacts CO–6 of the cutoff relay.

Release of the sleeve relay SL also interrupts the energizing circuits for the timing relay TMG, the interrupter pulse relays IP1 and IP2, and the interrupter slave relays IS1 and IS2, causing all of them to drop. The ground connection for all of these five relays is through the contacts SL–2, which open when the sleeve relay drops. When the reseizure relay RS picks up, its contacts RS–3 open to deenergize the ring trip relay TR, and its contacts RS–4 open to deenergize the hold battery relay HB.

The circuit is now in condition to receive a second call-waiting call, which will appear on the regular tip and ring leads 80 and 81. When this occurs, the line circuit applies a ground to main sleeve lead 84, once again picking up the sleeve relay SL, and closing its contacts SL–2, once again to pick up the timing relay TMG, and to initiate the cycling as hereinabove described of the interrupter relays IP1 and IP2 and the interrupter slave relays IS–1 and IS–2 to pick up the tone relay TNE twice for two quarter-second intervals spaced 12 seconds apart to advise the subscriber of the appearance of the second call-waiting call.

If the original call was an outgoing call, that is, one originated by the subscriber, disconnect is under his control and the extended timing relay EXT has been operated so that the sleeve relay SL will not drop until after dropping of the extended timing relay EXT. The operation of the circuit in response to disconnect by the subscriber is essentially as hereinabove described in connection with disconnect by the calling party on an incoming call, except that the sleeve relay SL drops before the subscriber goes off hook to talk to the call-waiting caller on the leads 92 and 93.

What is claimed is:

1. A relay tree arrangement to provide three-way calling service for an individual subscriber's line in a telephone switching system of the step-by-step type, said arrangement comprising an auxiliary line circuit, and a relay tree connected between the subscriber's line, his regular line circuit, and said auxiliary line circuit, said relay tree including:

a. means normally connecting the subscriber's line to his regular line circuit and enabling the placement and reception of calls through it in the ordinary way, b. seizure means for detecting when the subscriber is off hook, c. means for placing the regular line circuit on hold and connecting the subscriber's line to said auxiliary line circuit in response to the subscriber's going on hook momentarily after said seizure means has detected an off hook condition, d. means for connecting the inputs of the regular line circuit and said auxiliary line circuit in parallel in response to the subscriber's once again going on hook momentarily, and e. means for disconnecting the subscriber's line from said auxiliary line circuit in response to the subscriber's going on hook momentarily a third time.

2. A relay tree arrangement to provide call-waiting service for an individual subscriber's line in a telephone switching system of the step-by-step type, said arrangement comprising a relay tree connected between the subscriber's line, his regular line circuit, and a separate terminal to which the regular line circuit is connected, said relay tree including:

a. means normally connecting the subscriber's line to his regular line circuit and enabling the placement and reception of calls through it in the ordinary way, b. seizure means for detecting when the subscriber is off hook, c. means for detecting the appearance of a call incoming through the regular line circuit or at said separate terminal while the subscriber is off hook and connected to the other of the regular line circuit and said separate terminal, d. means responsive to said appearance detecting means for applying brief time spaced signals to the subscriber's line to advise the subscriber of the appearance of the incoming call, and e. means for thereafter switching the subscriber's line back and forth between the regular line circuit and said separate terminal in response to successive momentary openings of the subscriber's hookswitch, and simultaneously placing on hold the disconnected one of the regular line circuit and said separate terminal.

3. A relay tree arrangement according to claim 2 including:

a. means for distinguishing between outgoing and incoming calls, and b. means controlled by said distinguishing means for releasing the regular line circuit on an outgoing call in response to the subscriber's going on hook for a predetermined interval of greater duration than the momentary opening of the hookswitch required for response of said switching means.

4. A relay tree arrangement to provide three-way calling and call-waiting services for an individual subscriber's line in a telephone switching system of the step-by-step type, said arrangement comprising a first portion providing three-way calling service, a second portion providing call-waiting service, electrical interlocks connecting said first and second portions to insure unambiguous operation, said first and second portions being connected in tandem between the subscriber's line and the line circuit regularly assigned to it, said second portion being connected to a terminal in the connector bank of the system separate from the terminal to which the regular line circuit is connected, an auxiliary line circuit connected between said first portion and a terminal in the linefinder bank of the system separate from the terminal to which the regular line circuit is connected, said first portion including:

a. means normally connecting the subscriber's line to his regular line circuit through said second portion and enabling the placement and reception of calls through it in the ordinary way, b. seizure means for detecting when the subscriber is off hook, c. means for placing the regular line circuit on hold and connecting the subscriber's line to said auxiliary line circuit in response to the subscriber's going on hook momentarily after said seizure means has detected an off hook condition, d. means for connecting the inputs of the regular line circuit and said auxiliary line circuit in parallel in response to the subscriber's once again going on hook momentarily, and e. means for disconnecting the subscriber's line from said auxiliary line circuit in response to the subscriber's going on hook momentarily a third time, said second portion including:

f. means normally connecting the subscriber's line from said first portion to his regular line circuit and enabling the placement and reception of calls through said second portion in the ordinary way, g. seizure means for detecting when the subscriber is off hook, h. means for detecting the appearance of a call incoming through the regular line circuit or at said separate terminal while the subscriber is off hook and connected to the other of the regular line circuit and said separate terminal, i. means responsive to said appearance detecting means for applying brief time spaced signals to the subscriber's line to advise the subscriber of the appearance of the incoming call, and j. means for thereafter switching the subscriber's line back and forth between the regular line circuit and said separate terminal in response to successive momentary openings of the subscriber's hookswitch, and simultaneously placing on hold the disconnected one of the regular line circuit and said separate terminal, said electrical interlocks including:

k. means responsive to said appearance detecting means of said second portion for inhibiting the operation of said means of subparagraphs (c), (d), and (e) of said first portion during times when two calls are underway through said second portion, and l. means responsive to the means of subparagraph (c) of said first portion to insure that both the regular connector terminal and said separate connector terminal are marked busy from the initiation of a three-way call until its termination.

* * * * *